United States Patent
Weinberg et al.

(10) Patent No.: US 12,056,274 B2
(45) Date of Patent: Aug. 6, 2024

(54) EYE TRACKING DEVICE AND A METHOD THEREOF

(71) Applicant: EYEWAY VISION LTD., Or Yehuda (IL)

(72) Inventors: Yakov Weinberg, Modi'in (IL); Albert Kashchenevsky, Tel Aviv (IL); Erez Yehezkel, Ness Ziona (IL); Uri Korogodsky, Ramat Gan (IL); Igor Tikhonenkov, Kiriat Mozkin (IL); Jacob Kagan, Jerusalem (IL)

(73) Assignee: EYEWAY VISION LTD., Or Yehuda (IL)

( * ) Notice: Subject to any disclaimer, the term of this patent is extended or adjusted under 35 U.S.C. 154(b) by 398 days.

(21) Appl. No.: 17/426,578

(22) PCT Filed: Jan. 27, 2020

(86) PCT No.: PCT/IL2020/050100
§ 371 (c)(1),
(2) Date: Jul. 28, 2021

(87) PCT Pub. No.: WO2020/157746
PCT Pub. Date: Aug. 6, 2020

(65) Prior Publication Data
US 2022/0100268 A1    Mar. 31, 2022

(30) Foreign Application Priority Data
Jan. 29, 2019  (IL) ......................................... 264530

(51) Int. Cl.
*G06V 10/00*    (2022.01)
*G06F 3/01*     (2006.01)
(Continued)

(52) U.S. Cl.
CPC ............. *G06F 3/013* (2013.01); *G06N 20/00* (2019.01); *G06T 7/11* (2017.01); *G06T 7/60* (2013.01);
(Continued)

(58) Field of Classification Search
CPC .......... G06N 20/00; G06T 7/75; G06T 7/593; G06T 7/74; G06T 7/11; G06T 7/13;
(Continued)

(56) References Cited

U.S. PATENT DOCUMENTS

| 6,926,429 B2 * | 8/2005 | Barlow | G08B 21/06 340/576 |
| 8,824,779 B1 * | 9/2014 | Smyth | G06T 7/73 382/117 |

(Continued)

FOREIGN PATENT DOCUMENTS

| AU | 2004311482 B2 | 7/2005 |
| CN | 105431078 A | 3/2016 |

(Continued)

OTHER PUBLICATIONS

Sullivan nicholas, "WO 2014146199 A1; Sep. 25, 2014".*
(Continued)

*Primary Examiner* — Amir Alavi
(74) *Attorney, Agent, or Firm* — Kenealy Vaidya LLP

(57) ABSTRACT

The presently disclosed subject matter relates to an eye tracking method and device. The method can include receiving image data indicative of at least two images of a user's eye, identifying, in each image, regions related to the eye limbus; determining geometrical representation of the limbus structure, and determining a three-dimensional position and gaze direction of the user's eye (i.e. full six degrees of freedom of the eye) by triangulation of the geometrical representation of the limbus structure of at least two images.

24 Claims, 11 Drawing Sheets

(51) Int. Cl.
*G06N 20/00* (2019.01)
*G06T 7/11* (2017.01)
*G06T 7/60* (2017.01)
*G06T 7/73* (2017.01)
*G06V 40/18* (2022.01)

(52) U.S. Cl.
CPC .............. *G06T 7/74* (2017.01); *G06V 40/193* (2022.01); *G06T 2207/10012* (2013.01); *G06T 2207/20081* (2013.01); *G06T 2207/30201* (2013.01)

(58) Field of Classification Search
CPC ............. G06T 7/60; G06T 2207/10012; G06T 2207/20081; G06T 2207/30041; G06T 2207/30201; G06V 30/1801; G06V 30/182; G06V 30/1823; G06V 30/1826; G06V 30/1829; G06V 30/1831; G06V 30/1834; G06V 30/1837; G06V 10/42; G06V 10/44; G06V 40/193; G06F 16/5854; G06F 16/7854; G06F 3/013
See application file for complete search history.

(56) References Cited

U.S. PATENT DOCUMENTS

| | | | | |
|---|---|---|---|---|
| 9,370,302 | B2* | 6/2016 | Krueger | A61B 5/7257 |
| 9,704,038 | B2* | 7/2017 | Wu | G06F 3/013 |
| 9,775,512 | B1* | 10/2017 | Tyler | G06V 40/19 |
| 9,788,714 | B2* | 10/2017 | Krueger | G06F 3/013 |
| 10,043,075 | B2* | 8/2018 | Bennett | G06F 3/013 |
| 10,163,010 | B2* | 12/2018 | Kaehler | G06V 40/193 |
| 11,513,593 | B2* | 11/2022 | Drozdov | G06T 1/20 |
| 11,573,630 | B2* | 2/2023 | Nie | G06V 10/147 |
| 11,803,237 | B2* | 10/2023 | Tzvieli | G06V 40/19 |
| 2001/0035938 | A1 | 11/2001 | Lai et al. | |
| 2007/0040908 | A1 | 2/2007 | Cleveland et al. | |
| 2011/0131158 | A1 | 6/2011 | Furukawa et al. | |
| 2013/0120712 | A1 | 5/2013 | Spasovski | |
| 2014/0180162 | A1 | 6/2014 | Schuhrke et al. | |
| 2015/0131055 | A1* | 5/2015 | Catanzariti | A61B 3/0091 351/212 |
| 2015/0160726 | A1 | 6/2015 | Sullivan | |
| 2019/0005679 | A1 | 1/2019 | Nie | |
| 2020/0234495 | A1 | 7/2020 | Nakao et al. | |

FOREIGN PATENT DOCUMENTS

| | | |
|---|---|---|
| CN | 108369653 A | 8/2018 |
| JP | 2011113550 A | 6/2011 |
| JP | 2016062524 A | 4/2016 |
| WO | WO 94/18883 A1 | 9/1994 |
| WO | 2005065527 A1 | 7/2005 |
| WO | 2009080791 A1 | 7/2009 |
| WO | 2017066296 A1 | 4/2017 |
| WO | 2018150569 A1 | 8/2018 |
| WO | 2019012817 A1 | 1/2019 |

OTHER PUBLICATIONS

Schuhrke et al., "WO2013037606A1; determination of the azimuthal orientation of patient eye".*

Constable P.A, et al, International Society for Clinical Electrophysiology of Vision. ISCEV Standard for clinical electro-oculography (2017 update). Doc Ophthalmol. 2017;134(1):1-9.

McCamy, et al: Simultaneous recordings of ocular microtremor and microsaccades with a piezoelectric sensor and a video-oculography system. Peer J. 1. e14. 10.7717/peerj.14. (Feb. 12, 2013).

Kohlbecher, S., et al. "Calibration-free eye tracking by reconstruction of the pupil ellipse in 3D space", Proceedings of the 2008 Symposium on Eye Tracking Research & Applications: 135-138, Mar. 26, 2008.

Wood, E., et al. "EyeTab: model-based gaze estimation on unmodified tablet computers", Proceedings of the 2014 Symposium on Eye Tracking Research & Applications: 207-210, 2014.

* cited by examiner

EYE TRACKING DEVICE AND A METHOD THEREOF

CROSS REFERENCE TO RELATED APPLICATION(S)

This application is a national phase filing under 35 C.F.R. § 371 of and claims priority to PCT Patent Application No. PCT/IL2020/050100, filed on Jan. 27, 2020, which claims the priority benefit under 35 U.S.C. § 119 of Israeli Application No. 264530 filed on Jan. 29, 2019, the contents of each of which are hereby incorporated by reference in their entireties.

BACKGROUND

Some embodiments of the presently disclosed subject matter are directed to an eye tracking device and method for determining the eye position and/or the viewing direction.

References considered to be relevant as background to the presently disclosed subject matter are listed below:

1. US patent application No. 2013/120712;
2. International patent application No. WO9418883;
3. US patent application No. 2014/180162;
4. US patent application No. 2001/035938.
5. Constable P A, Bach M, Frishman L J, Jeffrey B G, Robson A G, International Society for Clinical Electrophysiology of Vision. ISCEV Standard for clinical electro-oculography (2017 update). Doc Ophthalmol. 2017; 134(1):1-9.
6. McCamy, Michael & Collins, Niamh & Otero-Millan, Jorge & Al-Kalbani, Mohammed & Macknik, Stephen & Coakley, Davis & Troncoso, Xoana & Boyle, Gerard & Narayanan, Vinodh & R Wolf, Thomas & Martinez-Conde, Susana. (2013). Simultaneous recordings of ocular microtremor and microsaccades with a piezoelectric sensor and a video-oculography system. Peer J. 1. e14. 10.7717/peerj.14.

Acknowledgement of the above references herein is not to be inferred as meaning that these are in any way relevant to the patentability of the presently disclosed subject matter.

There are different eye tracking devices known from the related art, such as remote eye trackers or head-mounted eye trackers, as well as different eye tracking methods. The first eye-trackers were built at the end of 19th century. They were difficult to build and caused discomfort to the participants. Specially designed rings, contact lenses, and sucker cups were attached to the eyes to help in eye movement measurements. The first photography based eye trackers, which examined light reflected from the different parts of the eye, were introduced at the beginning of the 20th century. They were much less intrusive and launched a new era of eye research. For the most part of 20th century, researchers built their own eye trackers, which were costly and of limited availability. The first commercially available eye trackers appeared in the 70's. From around the 50's, a number of different techniques were developed by researchers that are still in use today, such as contact lenses (suction cups, more precisely) with mirrors, contact lenses with coils, electrooculography (EOG) [5], and piezoelectric sensors [6]. However, these methods are capable only of angular eye movements and cannot measure any lateral eye shifts due to their nature (mirrors, coils and EOG can only measure angles). Also, these systems are stationary and may require users' head stabilization, thus making them unsuitable for research of eye movements in a more natural environment.

The second part of the 20$^{th}$ century was dominated by a much less intrusive illumination and light sensors-based approach. The main limitation of this approach is that cameras are relatively slow, due to the exposure and processing power that can be required to extract eye movement data. Position-Sensing Photodetectors (PSD) or Quad based approaches were developed in the middle of the 20$^{th}$ century. Dual Purkinje Imaging eye tracker systems were developed in 70's and are still in use today. However, Dual Purkinje Imaging eye tracker systems are very costly, stationary, heavy camera-less (PSD based) systems, with relatively low angles of recording. Starting from the 80's, due to improvements in of camera sensors and computer technology, the eye tracking market became dominated by so-called Video OculoGraphy (VOG) systems. VOG systems usually capture images of an eye of a user and determine certain features of the eye on the basis of the captured images. These systems are non-intrusive and usually rely on infra-red illumination of the eye that do not cause disturbance or discomfort to the user. Some of them rely on small lightweight cameras that are wearable, but more precise systems are stationary, as are most of the systems mentioned above. Due to the fact that good illumination (but below the safety level) may be required, and considering the exposure requirements of the camera sensors, the frame rate of these systems is limited.

The combined pupil/cornea reflection (1st Purkinje) eye tracker approach (both stationary high end and wearable lower end) illuminates an eye with a number of infra-red light diodes, and images the surface of the eye with one or more (usually to increase the frame-rate) cameras, segmenting the pupil (as the darkest part of the eye) and first Purkinje images of the diodes. Change of the pupil position relative to 1st Purkinje images of the IR diodes, indicates movement of the eye. User calibration must in this embodiment be used to calculate the real angles. Usually, a user may be required to focus onto some target, moving on a known path to calibrate the system.

The precision and accuracy of this approach is relatively low, since pupil location is distorted by the cornea, pupil dilation further decreases measurement precision, and ambient reflections from the cornea confuse image processing algorithms. Different eye colors, long eye lashes, and contact lenses are each additional factors, further complicating image processing systems. Thus, usually these systems are noisy and provide less than 1 degree precision for angular movements, with no information on lateral eye movements. Moreover, after shift of the system relative to the head, recalibration may be required. A number of other less common approaches exist, such as imaging the retina, the bright pupil approach, and even examining eye movement with an MRI machine. These approaches have their limitations and are not very common. With regard to eye trackers and eye tracking methods in general, there will usually persist the need for enhancing accuracy, precision, low latency and compact size. Moreover, as eye trackers become more integrated in numerous devices, such as computers, cars, virtual-reality-glasses, and so on, there is also a need to provide very compact eye tracking devices which offer much flexibility.

Eye tracking systems may track inter alia the limbus (the boundary between sclera and iris regions), or the pupil-iris-boundary, to measure relative eye rotation. It should be noted that the limbus is not influenced by the optical power of the cornea, and therefore tracking the limbus provides accurate results. Moreover, the limbus creates a straight plane. The limbus defines the region of connection between the iris's muscles and therefore there is a direct correlation between the three-dimensional parameters of the limbus and the three-dimensional parameters of the eye. Unfortunately, the limbus is more a transitional zone between the cornea and the sclera, rather than a sharp boundary. Prior limbus trackers have not been successful because the limbus is a poor candidate for any technique relying on so-called feature points or edge detection. Therefore, poorly defined edges and shapes that appear to deform, due to rotations, have led to difficulties in extracting signals from noise. As a result, techniques which rely on edge detection or feature points' detection of the limbus, may lack the desired accuracy and precision. While adequate tracking response may be possible using known "pin-point" limbus trackers with accurately aligned photodetectors disposed precisely along the edge of the iris/sclera interface, providing and/or maintaining such alignment adds additional system components and complexity, particularly in light of the variability of eye geometry between different patients. Some techniques for tracking the limbus rely on a set of two quadrant detectors as the position-sensing photodetectors (PSDs). The simple fact that the iris, surrounded by limbus, is darker than the sclera, allows building a system, including one or more quads that examine the border of the iris/sclera areas, i.e. the limbus. When the eye moves, the image of the iris also moves across the PSD, thus allowing estimating the eye movement that causes this. Despite the fact that it allows to stabilize a laser on the cornea area, it does not provide direct indication of where eye is looking, and user calibration may be required to obtain this data. In addition, many factors that can be controlled during eye surgery, such as eyelid movements, eyelashes, and even the smallest illumination changes, influence the precision of this approach and make it unsuitable for eye research. Limbus trackers that were based on PSD, measure the center of mass of light spot location. This is because there is a contrast between white sclera and a darker iris. If the eye moves relative to the system, the light spot on the PSD also moves, correspondingly. Such systems merely control that the image of the iris is located on the same spot on the PSD, but do not measure, and are incapable of estimating actual eye location.

SUMMARY

Eye tracking refers to the process of tracking movements of the eye and determining where the user is looking. The different techniques described above estimate approximately the scale of eye movements and may indicate that movement has occurred. However, they do not measure six degrees of freedom of eye movement. Moreover, these systems do not track the visual features of the eye. One of the problems associated with tracking the visual features of the eye is that the most distinctive features of the eye are located on the iris. Both pupil and iris are strongly distorted by the corneal lens. The shape of this lens differs from person to person, so it is presents a challenge to understand where exactly these features are located. Astigmatism (cornea asymmetry) further complicates this issue. The limbus (i.e. the border between the white sclera and darker iris) is not distorted by the cornea, but it looks very uniform, is slightly blurred, and does not have any prominent features sought by classical image processing algorithms. Therefore, there is a need in the art to provide a technique for eye tracking which is based on limbus tracking. The inventors have found that limbus eye tracking may be provided by triangulating identified stable regions being real, i.e. directly corresponding to some directly visible anatomical or virtual features, i.e. calculated, features.

According to a broad aspect of the presently disclosed subject matter, there is provided an eye tracking method including receiving image data indicative of at least two images of a user's eye, identifying, in each image, regions related to the eye limbus; determining geometrical representation of the limbus structure, and determining a three-dimensional position and gaze direction of the user's eye (i.e. full six degrees of freedom of the eye) by triangulation of the geometrical representation of the limbus structure of at least two images. Because the limbus maintains a fixed relationship and a close circularity with respect to the lens of the cornea, a three-dimensional position and gaze direction of the user's eye may be obtained by triangulation of the geometrical representation of the limbus structure (i.e. two-dimensional eye limbus parameters) of at least two images. The shapes in the at least two images are identified and matched. The three-dimensional distance to matching regions can be determined using triangulation. An epipolar geometry technique, commonly used in the field, is applied to match corresponding regions, and optionally determine the three-dimensional eye limbus parameters. The three-dimensional position and gaze direction of the user's eye is determined, based on the three-dimensional limbus parameters.

In this connection, it should be understood that generally, stereo vision algorithms rely on matching corresponding points or edges between two images. There are two basic classes of approaches: intensity-based techniques, in which the information in the intensity values of each line is matched at each pixel, the difference in intensities being minimized, and feature-based techniques, in which information is extracted using a group of pixel values and their spatial distribution. The commonly used features are simple features, e.g. edge and corner detectors (Canny, Harris, LoG filters). Generally, eye tracking systems, relying on the features mentioned above, suffer from several drawbacks, such as different noise generated by each of the plurality of photodetectors as a result of parasitic reflections on the cornea and distortion of the iris and pupil features as a result of the curvature of the cornea lens. Therefore, eye tracking based on feature-based techniques does not provide sufficiently accurate results. In addition, methods that are based on matching cornea reflections vs. eye features, may require user calibration. With respect to limbus tracking, as described above, the limbus does not have well-defined features, and therefore the classical approaches do not provide three-dimensional eye limbus parameters. It should be noted that the technique of the presently disclosed subject matter may not require user calibration of the eye tracking device and provides an accurate eye tracking with accuracy and precision in the range of about ⅙ degrees to ⅟₆₀ degrees.

In some embodiments, the method includes capturing at least two images of a user's eye at different angles.

In some embodiments, determining geometrical representation of the limbus structure includes digital image pre-processing. The digital image pre-processing includes calculating an image intensity gradient map of the limbus based on the pupil direction, identifying in each image at least one region of the limbus structure in which the local directions of the gradient are substantially uniform, and processing data indicative of the limbus structure by weighting the pixels of such regions, and generating a geometrical representation of the limbus structure based on the matching pixels related to the eye limbus.

In some embodiments, the method includes determining three-dimensional limbus parameters including at least one of the three coordinates of the center of the limbus and the direction of the normal to the limbus plane, the location of the plane of the limbus and the size of the limbus. Determining the three-dimensional position and gaze direction of the user's eye can be based on the three-dimensional limbus parameters.

In some embodiments, the method further includes determining the radius of the limbus and/or torsional rotation of the limbus.

In some embodiments, the method further includes identifying image data indicative of initial limbus region in each image by using an iterative pixel filtration process and generating data indicative of the initial limbus region.

In some embodiments, identifying in each image, image data indicative of the initial limbus region includes at least one of identifying image data indicative of eye features such as pupil, eyelids, sclera iris and eyelashes, and identifying initial limbus region based on anatomical parameters. Identifying image data indicative of eye features may be performed by using machine learning.

In some embodiments, identification of image data indicative of eye features includes segmenting each image for identifying pixels related to the pupil region.

In some embodiments, the method further includes performing triangulation between the at least two pupil geometric representations to determine three-dimensional pupil parameters, estimating the location of the initial eye limbus region based on the three-dimensional pupil parameters, and generating data indicative of the initial region location of the limbus in each image. The three-dimensional pupil parameters include at least one of the direction of the normal to the pupil plane, the coordinates of the center of the pupil, and the pupil diameter in each image.

In some embodiments, the method further includes processing the triangulated three-dimensional limbus, re-projecting the triangulated limbus region back to image planes, and refining the limbus region at each image.

According to another broad aspect of the presently disclosed subject matter, there is provided an eye tracking device including a processing unit configured and operable for receiving at least two images being indicative of a user's eye, identifying, in each image, regions related to eye limbus; determining geometrical representation of the limbus structure, and determining a three-dimensional position and gaze direction of the user's eye by triangulation of the geometrical representation of the limbus structure of at least two images. The processing unit is configured and operable to determine a three-dimensional position and gaze direction of the user's eye, based on the three-dimensional limbus parameters. The eye tracking device of the presently disclosed subject matter may be a head-mounted eye tracking device, like an eye tracking spectacle device, or an eye tracker integrated in a helmet or also integrated in a head-mounted display device, in virtual reality glasses, in augmented reality glasses, or other head worn devices. The eye tracking device may also be a remote eye tracker, optionally integrated or coupled with other devices such as a computer, displays, monitors, and so on.

In some embodiments, the eye tracking device further includes at least two imagers, each imager being configured for capturing at least one image of user's eye at a different angle.

The imager may be a capturing unit and may include one or more cameras (i.e. digital cameras or video camera), light sensors, like image sensors, for example a CCD sensor or a CMOS sensor. One imager may be used and moved rapidly on the known trajectory with known speed. Alternatively, an optical image with some kind of mirrors can also be used. In some embodiments, the presently disclosed subject matter uses stereo imagers to use two or more imagers with precisely known relative offsets. The two or more imagers may take the images simultaneously, or with known time delays (e.g. in interlace mode).

In general, the processing unit may be a processor, a controller, a microcontroller or any kind of integrated circuit. The eye tracking device may be associated with an optical system which can include any optical elements such as one or more lenses, prisms, beam splitters, mirrors, reflectors, light guides, collimators, and so on. The eye tracking device is also associated with an illumination source configured to create as much dispersed illumination as possible, possibly one that does not create any, or minimizes, the amount of patterns on the eye surface. The eye tracking device includes a processing unit in data communication with each of the at least two imagers to receive the at least two images.

The novel technique of the presently disclosed subject matter uses two or more captured images of the eye, and detect, in each of the captured images, the three-dimensional eye limbus parameters by an iterative pixel filtration process, thus determining the orientation of the eyeball by triangulation of the eye limbus two dimensional parameters obtained from the images. The novel technique determines eye orientation based on identification of the limbus in a user's eye in imagery data. Two or more imagers may be used to capture respective two or more images of the user's eye. Each imager is configured to capture the user's eye from a different angle. Each image images a user's iris and adjacent and surrounding areas, including the pupil, sclera, eyelids, etc. For triangulation of the limbus region, a plurality of images of an eye are captured from two or more different angles, possibly close in time (e.g. simultaneously).

In some embodiments, the processing unit includes a region detector being configured to receive each image of the at least two images being indicative of a user's eye, and identify, on each image, image data indicative of the initial limbus region i.e. some possibly initial undistorted (i.e. not distorted by eye optics itself e.g. cornea) regions/areas (i.e. real or virtual calculated areas), or regions with known distortions corresponding to the same physical area of the eye, by using an iterative pixel filtration process, and generating data indicative of the initial limbus region. The inventors have found that these identified stable regions may be used for triangulation calculation. The presently disclosed subject matter allows generating such stable regions corresponding to the same physical area of the eye, and identifying them on the stereo images. The region detector is configured for identifying image data indicative of the initial limbus region by at least one of identifying image data indicative of eye features such as the pupil, eyelids, sclera, iris and eyelashes, and identifying the initial limbus region based on anatomical parameters. These regions may be identified by projecting a geometrical representation of an eye feature (e.g. pupil) on each image, then the regions matched between the images, taken at different angles. The greater the size of such regions on the image, the more precisely the location of the corresponding physical areas is triangulated, and consequently the location of the eye itself. The region detector generates a function defining a two-dimensional virtual object on the eye by using an iterative pixel filtration process enabling to perform triangulation. This triangulation defines a limbus direction that corresponds to gaze direction. The limbus parameters are defined as a mathematical equation in which the variables are (x, y, z, α, β and δ) representing the six degrees of freedom of movement of a rigid body in three-dimensional space. Specifically, x, y, z, defines the change in position as forward/backward (surge), up/down (heave), left/right (sway) translation in three perpendicular axes, combined with changes in orientation through rotation about three perpendicular axes, yaw (normal axis), pitch (transverse axis), and roll (longitudinal axis).

In this connection, it should be understood that the determination of the three-dimensional limbus parameters enables to locate such undistorted regions, or regions with known distortions corresponding to the same physical area of the eye, because the dimensions of the limbus are large, and practically not distorted by the cornea. However, as mentioned above, the limbus itself has borders that appear to be slightly blurred and are not well defined, it looks different on each image, and it does not have distinguishable features that may serve as anchor points for such matching. Therefore, matching the limbus regions themselves on two or more different images presents a challenge. The inventors have found that instead of trying to match the features of the limbus regions themselves, digital image pre-processing can be performed to allow to calculate some virtual regions, based on limbus three-dimensional parameters of each image that do correspond well to the same physical areas of the eye. Digital image pre-processing includes the use of complex algorithms, such as classification, feature extraction, multi-scale signal analysis, pattern recognition or projection mathematical transformations. The virtual regions should correspond to the same physical areas of the eye, without dependency on the angle at which an image was taken. The region detector is thus configured and operable for identifying image data indicative of the limbus region in each image, and generating data indicative of the limbus region. This may be implemented by estimating the limbus region by using the anatomical relationship between the identified virtual regions corresponding to certain eye features and the limbus. For example, the position and the center of the pupil may be calculated by triangulation of the pupil region (i.e. a region having a defined circular contrast) between the two images, and then the limbus region may be defined as the circular region having a certain radius range (e.g. about 5.5 mm to 6.5 mm) around the center of the pupil. The radius range may be based on statistical data defining Gaussian distribution of the distance between the limbus and the center of the pupil.

In some embodiments, pattern recognition tools are used to identify, in each image, pixels of the pupil, and pixels of the eyelids. Image pixels of the pupil can be identified due to a certain contrast in the image. Identified image regions corresponding to the pupils are discarded, and image regions of the eyelids may be used to determine calibration data (e.g. distance/angle of each imager, pupil/limbus center and general direction). More specifically, the data image related to the possible intersection between eyelids and the estimated limbus region is discarded, thus further reducing a number of potential limbus pixels. The two dimensional eye limbus parameters are then identified based on the calibration data and a three-dimensional model of the eye. An iterative filtration process is then used to discard, in each of the two or more captured images, pixels located at the boundaries of the limbus. The geometrical representation of the limbus structure includes a ring-shaped or an ellipse-shaped structure. When the limbus is assumed to be circular, the limbus two dimensional parameters obtained from each image are then used to define, for each image, a complete limbus ring/elliptic structure function (reconstructed after discarding eyelid regions hiding the limbus region), and eye orientation is determined by triangulation of the defined limbus ring/elliptic structures obtained from each image. The filtering out of the image data corresponding to certain eye features enables to discard certain pixels, and to enhance the resolution. If the technique does not succeed in determining the eye orientation, the process is repeated again while the limbus region is increased to potentially hold limbus related pixels.

In some embodiments, the method includes the following steps: first, the limbus region is isolated, then mathematical transformation is performed such as, for example, finding a geometrical representation of the limbus structure (e.g. by projecting a set of ellipse functions that go through the middle of the limbus ring) on each one of the images, and triangulating the corresponding circle in six degrees of freedom (6 DOF) aligned strongly to the physical eye.

In some embodiments, the processing unit includes a limbus detector configured and operable for receiving data indicative of the limbus region, and determining geometrical representation of the limbus structure by digital image pre-processing such as performing a limbus recognition process on each image and/or performing mathematical transformations including using an intensity gradient map. More specifically, the digital image pre-processing may include calculating an image intensity gradient map of the limbus region, identifying at least one region of the limbus structure in which the local directions of the gradient is substantially uniform, processing data indicative of the limbus structure by weighting the pixels of such regions, and determining geometrical representation of the limbus structure based on the matching pixels related to the eye limbus.

More specifically, after having estimated the limbus region, a ring-shaped region is projected onto the eye surface at the estimated limbus region. Most of the pixels of the image, like the pupil, most of the iris, most of the sclera and most of the eyelids, are then discarded, leaving the ring around a potential limbus location, based on the estimated anatomical properties of the normal eye and optionally calculated three-dimensional pupil position. However, additional estimation error is possible, because of the cornea distortion of the pupil image. This distortion leads to the increasing of an initial estimation of the limbus region.

In some embodiments, the region detector is configured for identifying image data indicative of eye features by using machine learning. The iterative pixel filtration process is used for training neural network(s) to identify the limbus region in each acquired image. The region detector may be configured and operable for identifying the image data indicative of eye features by segmenting each image for identifying pixels related to the pupil region. Neural network (s) may thus be used to segment the approximate limbus region directly. More specifically, to estimate the limbus region, the pupil can be tracked. Additionally or alternatively, neural networks may also be used to estimate the position of other eye features such as eyelids and sclera, directly, without going through the pupil tracking. Neural networks may be applied on the image itself, or on the mathematically transformed image, i.e. gradient map. The neural network can be trained on conventional machine learning algorithms, for example based on results of other eye tracking techniques in which eye feature characteristics have been previously defined.

In some embodiments, the processing unit is configured and operable to determine the size of the limbus.

In some embodiments, the pixels of the identified eyelid region are triangulated, to improve the estimation of the position of the eye.

In some embodiments, the eye tracking device further includes a limbus triangulator being configured and operable to receive data indicative of geometrical representation of the limbus structure for each image, and to perform triangulation of the geometrical representations of at least two images to determine the three-dimensional limbus parameters. The three-dimensional limbus parameters include at least one of the three coordinates of the center of the limbus and the direction of the normal to the limbus plane, the location of the plane of the limbus, and the size of the limbus. The limbus triangulator may be configured and operable to determine the radius of the limbus and/or torsional rotation of the limbus.

In some embodiments, the limbus triangulator is configured for performing triangulation between the at least two pupil geometric representations to determine three-dimensional pupil parameters; the three-dimensional pupil parameters include at least one of the direction of the normal to the pupil plane, the coordinates of the center of the pupil and the pupil diameter, estimating the location of the initial eye limbus region based on the three-dimensional pupil parameters, and generating data indicative of the initial region location of the limbus in each image.

In some embodiments, the limbus triangulator is configured for processing the triangulated three-dimensional limbus, re-projecting the triangulated limbus region back to image planes, and refining the limbus region at each image.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
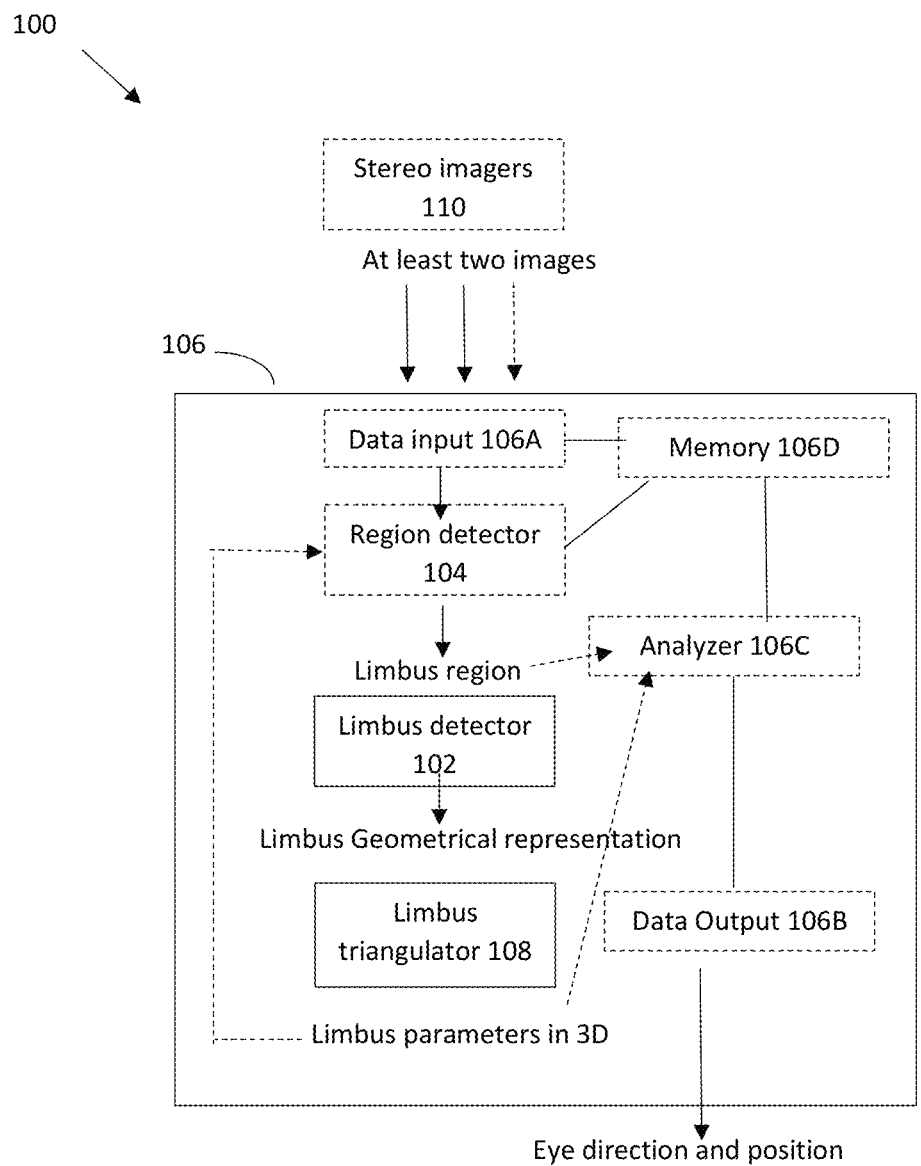
FIG. 1 is a schematic block diagram representing the main functional parts of the eye tracking device of the presently disclosed subject matter.

Reference is made to FIG. 1, exemplifying a block diagram illustrating the main functional parts of the eye tracking device of the presently disclosed subject matter. The eye tracking device 100 includes a processing unit 106 configured and operable for receiving at least two images being indicative of a user's eye, identifying, in each image, regions related to the eye limbus, determining geometrical representation of the limbus structure, and determining a three-dimensional position and gaze direction of the user's eye by triangulation of the geometrical representation of the limbus structure of at least two images. In this connection, it should be noted that, as detailed above, the presently disclosed subject matter triangulates shapes (geometrical representation), but not individual corresponding points or edges.

The processing unit 106 is configured generally as a computing/electronic utility including inter alia such utilities as data input and output modules/utilities 106A and 106B, memory 106D (i.e. non-volatile computer readable medium), and analyzer/data processing utility 106C. The utilities of the processing unit 106 may thus be implemented by suitable circuitry and/or by software and/or hardware components including computer readable code configured for implementing the operations of method 200 shown in FIG. 2 and described below.

The features of the presently disclosed subject matter may include a general-purpose or special-purpose computer system including various computer hardware components, which are discussed in greater detail below. Features within the scope of the presently disclosed subject matter also include computer-readable media for carrying out or having computer-executable instructions, computer-readable instructions, or data structures stored thereon. Such computer-readable media may be any available media, which are accessible by a general-purpose or special-purpose computer system. By way of example, without limitation, such computer-readable media can include physical storage media such as RAM, ROM, EPROM, flash disk, CD-ROM or other optical disk storage, magnetic disk storage or other magnetic storage devices, or any other media which can be used to carry or store desired program code in the form of computer-executable instructions, computer-readable instructions, or data structures and which may be accessed by a general-purpose or special-purpose computer system. Computer-readable media may include a computer program or computer application downloadable to the computer system over a network, such as a wide area network (WAN), e.g. Internet.

In this description and in the following claims, a "processing unit" is defined as one or more software modules, one or more hardware modules, or combinations thereof, which work together to perform operations on electronic data. For example, the definition of a processing utility includes the hardware components of a personal computer, as well as software modules, such as the operating system of a personal computer. The physical layout of the modules is not relevant. A computer system may include one or more computers coupled via a computer network. Likewise, a computer system may include a single physical device where internal modules (such as a memory and processor) work together to perform operations on electronic data.

While any computer system may be mobile, the term "mobile computer system" or the term "mobile computer device" as used herein, especially include laptop computers, netbook computers, cellular telephones, smartphones, wireless telephones, personal digital assistants, portable computers with touch sensitive screens, and the like. Processing unit 106 may include a processor embedded therein running a computer program, or attached thereto. The computer program product may be embodied in one or more computer readable medium(s) having computer readable program code embodied thereon. The computer readable medium may be a computer readable signal medium or a computer readable storage medium. Computer program code for carrying out operations for aspects of the presently disclosed subject matter may be written in any combination of one or more programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). These computer program instructions may be provided to the processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks. The specified functions of the processor can be implemented by special purpose hardware-based systems that perform the specified functions or acts, or combinations of special purpose hardware and computer instructions.

The eye tracking device 100 may include at least two imagers 110, each imager being configured for capturing at least one image of a user's eye at a different angle. Each imager may be focused on the user's iris. In this connection, it should be noted that the limbus tracking of the presently disclosed subject matter is performed for each eye independently.

In some embodiments, the processing unit 106 includes a limbus detector 102 configured and operable for receiving data indicative of the limbus region, and determining a geometrical representation of the limbus structure (e.g. a ring-shaped or an ellipse-shaped structure) by digital image pre-processing. In a specific and non-limiting example, the limbus detector 102 is configured and operable to perform a limbus recognition process on each image, and/or perform mathematical transformations of the image including using an intensity gradient map and then running a limbus area recognition process on the transformed image. In other words, the limbus detector 102 may transform an image into an intensity gradient map, then a limbus area is searched on the transformed image. An entropy map may also be used instead of, or in addition to, a gradient map, or the processing may be performed directly on the image. If an intensity gradient map is used, the limbus detector 102 may calculate an image intensity gradient map of the limbus region, identify at least one region of the limbus structure in which the local direction of the gradient is substantially uniform, and process data indicative of the limbus structure by weighting the pixels of such regions and determining geometrical representation of the limbus structure based on the matching pixels related to the eye limbus. In addition to collinearity, a knowledge of anatomical form of the limbus may be used, i.e. collinear vectors should go radially from the center of the limbus and the whole limbus area is continuous. More specifically, the region of the limbus structure is determined by identifying the local uniformity, i.e. the direction of the gradient of each point can be collinear only with its neighbors.

Each module of the processing unit 106, such as limbus detector 102 is not limited to a specific number of modules and may be configured to process a plurality of images independently, simultaneously or not so. The limbus triangulator 108 is configured and operable to perform triangulation of the geometrical representation of the limbus structure in at least two images to determine three-dimensional limbus parameters. Limbus triangulator 108 may also be configured and operable to determine radius of the limbus and/or torsional rotation of the limbus. The three-dimensional limbus parameters defines at least five degrees of freedom of the position and the direction of the limbus. The three-dimensional limbus parameters include the location of the plane of the limbus and/or the direction of the normal to the limbus plane and/or the size of the limbus and/or the center of the limbus or any one of the combinations thereof.

In some embodiments, the processing unit 106 includes a region detector 104 configured and operable for receiving each image of the at least two images being indicative of each user's eye and identifying image data indicative of the initial limbus region in each image by using an iterative pixel filtration process and generating data indicative of the initial limbus region. This may be implemented by identifying image data indicative of eye features such as pupil, eyelids, sclera, iris and eyelashes and/or identifying the initial limbus region based on anatomical parameters. More specifically, identifying the initial limbus region may include pupil segmentation and triangulation of pupil and/or limbus region estimation based on anatomy and/or eyelid region estimations and/or limbus region estimation without the eyelid areas. This may be implemented by limbus triangulator 108 or by any other processing module. However, the presently disclosed subject matter is not limited to any specific module configuration of the processing unit 106. The processing unit 106 may include a pupil detector, pupil triangulator and other modules. For example, identification of the image data indicative of eye features may include pupil segmentation. The region detector 104 may thus be a pupil detector aimed at providing an initial limbus ring. It is assumed that both of these regions, pupil and limbus, are co-centered and are in the same plane. Pupil segmentation may be implemented by segmenting each image for identifying pixels related to the pupil region, performing triangulation between the at least two images to determine three-dimensional pupil parameters, estimating the location of the initial eye limbus region based on the three-dimensional pupil parameters, and generating data indicative of the initial region location of the limbus in each image. The three-dimensional pupil parameters include the direction of the normal to the pupil plane and/or the coordinates of the center of the pupil and/or the pupil diameter. The three-dimensional pupil parameters are used to estimate the three-dimensional limbus parameters, thus defining an initial limbus area that can be further refined. Identification of the image data indicative of eye features may also include identification of eyelids and filtering out of this image data, since image data relating to the eyelids blocks a part of the limbus ring. The presently disclosed subject matter is not limited to a particular way to identify the image data indicative of the initial limbus. Neural network-based approaches may be used for identifying image data indicative of the initial limbus. For example, limbus region estimation may be performed with neural networks, but a pupil detector may be used to estimate eyelid regions with classical algorithms. Alternatively, limbus region estimation and eyelids region estimation may be performed with a neural network based approach. Alternatively, neural networks may be used solely for pupil segmentation.

In some embodiments, the region detector 104 is configured for identifying image data indicative of eye features by using machine learning. Machine learning is capable of self-classifying/learning characteristics of input data related to the eye features. Region detector 104 may use a data recognition model based on a neural network to predict the three-dimensional eye limbus parameters. The network can be trained based on the segmentation results of classical approaches, or by using an existing system for training. Additionally or alternatively, the three-dimensional eye limbus parameters obtained by the eye tracking device of the presently disclosed subject matter may be used to train a neural network. A deep-learning network (DLN), such as an artificial neural network (ANN), implemented by region detector 104, may generate a representation of the limbus based on the series of images. For example, the representation generated by the DLN may include probabilities on the placement of the limbus. This representation is used to generate a model of the limbus adapting a recognition classifier to a person.

After the limbus detector 102 has determined the three-dimensional limbus parameters, the region detector 104 may receive the three-dimensional limbus parameters to generate further more precise data indicative of the limbus region. For example, the limbus triangulator 108 is configured for processing the triangulated three-dimensional limbus, re-projecting the triangulated limbus region back to image planes, and refining the limbus region at each image.

Figure 2:
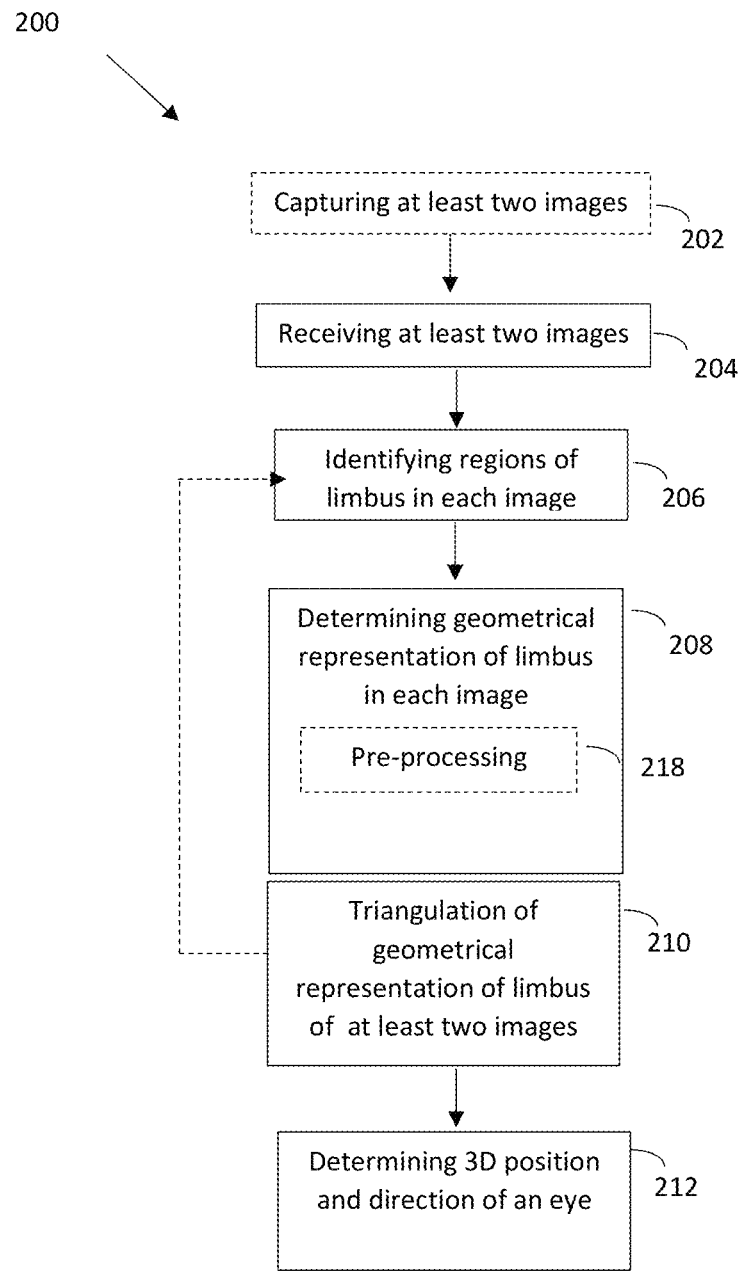
FIG. 2 is a schematic flow chart representing the main steps of the eye tracking method of the presently disclosed subject matter.

Reference is made to FIG. 2, exemplifying a flow chart diagram illustrating the main steps of the eye tracking method of the presently disclosed subject matter. The method 200 for eye tracking includes receiving image data indicative of at least two images of a user's eye in 204; identifying regions related to eye limbus in each image in 206; determining geometrical representation of the limbus structure in 208; and performing a triangulation of the geometrical representation of the limbus structure of at least two images in 210 to thereby determine a three-dimensional position and gaze direction of the user's eye in 212.

In some embodiments, step 210 includes performing a triangulation of the geometrical representation of the limbus structure in at least two images to determine three-dimensional limbus parameters as described above. Determining the three-dimensional limbus parameters may include determining a radius of the limbus and/or torsional rotation of the limbus.

In some embodiments, after the triangulation of the geometrical representation of the limbus structure of at least two images in 210, method 200 may include determining the geometrical representation of the limbus structure by processing the three-dimensional limbus parameters to generate further more precise data indicative of the limbus region.

In some embodiments, the method 200 may also include capturing at least two images of each user's eye at a different angle in 202.

In some embodiments, determining geometrical representation of the limbus structure in 208 may include digital image pre-processing in 218 such as performing a limbus recognition process on each image or performing mathematical transformations of the image including using an intensity gradient map and then running a limbus area recognition process on the transformed image. The step of digital image pre-processing in 218 may include calculating an image intensity gradient map of the limbus region, identifying at least one region of the limbus structure in which the local direction of the gradient is substantially uniform, and processing data indicative of the limbus structure by weighting the pixels of such regions and determining geometrical representation of the limbus structure based on the matching pixels related to the eye limbus. More specifically, digital image pre-processing may include determining the region of the limbus structure by identifying the local uniformity, i.e. the direction of the gradient of each point can be collinear only with its neighbors. As described above, an entropy map may also be used as an intensity gradient map (instead of or in addition to a gradient map), or the processing may be performed directly on the image.

In some embodiments, identifying regions related to the eye limbus in each image in 206 may include identifying image data indicative of eye features such as pupil, eyelids, sclera, iris and eyelashes and/or identifying an initial limbus region based on anatomical parameters by using an iterative pixel filtration process and generating data indicative of the initial limbus region. For example, an eyelids region estimation may be implemented in parallel with the pupil and limbus region. The presently disclosed subject matter is not limited to the order of estimation of the different regions. Different eye feature regions may be determined based on any geometrical shape models (e.g. ellipses or circles).

In some embodiments, identifying an initial limbus region may include pupil segmentation and triangulation of pupil and/or limbus region estimation based on anatomy and/or eyelid region estimations and/or limbus region estimation without eyelid areas. The method may include segmenting each image for identifying pixels related to the pupil region, performing triangulation between the at least two images to determine three-dimensional pupil parameters, estimating the location of the initial eye limbus region based on the three-dimensional pupil parameters, and generating data indicative of the initial region location of the limbus in each image. Identifying image data indicative of eye features may also include identifying eyelids and filtering out this image data, since the image data relating to the eyelids blocks a part of the limbus ring. As described above, the presently disclosed subject matter is not limited to any particular way to identify the image data indicative of the initial limbus. Neural network-based approaches may be used for identifying image data indicative of the initial limbus. Limbus region estimation and eyelid region estimation may also be performed with a neural networks based approach. Neural networks may also be used solely for pupil segmentation.

In some embodiments, identifying image data indicative of eye features may be implemented by using machine learning. Determining (i.e. predicting) the three-dimensional eye limbus parameters may include using a data recognition model based on a neural network. The method may include training the network based on the segmentation results of classical approaches, or by using an existing system for training. Generating a representation of the limbus based on the series of images may be obtained by using a deep-learning network (DLN), such as an artificial neural network (ANN). For example, generating a representation of the limbus may include calculating probabilities on the placement of the limbus and/or generating a model of the limbus, adapting a recognition classifier to a person.

Figure 3:
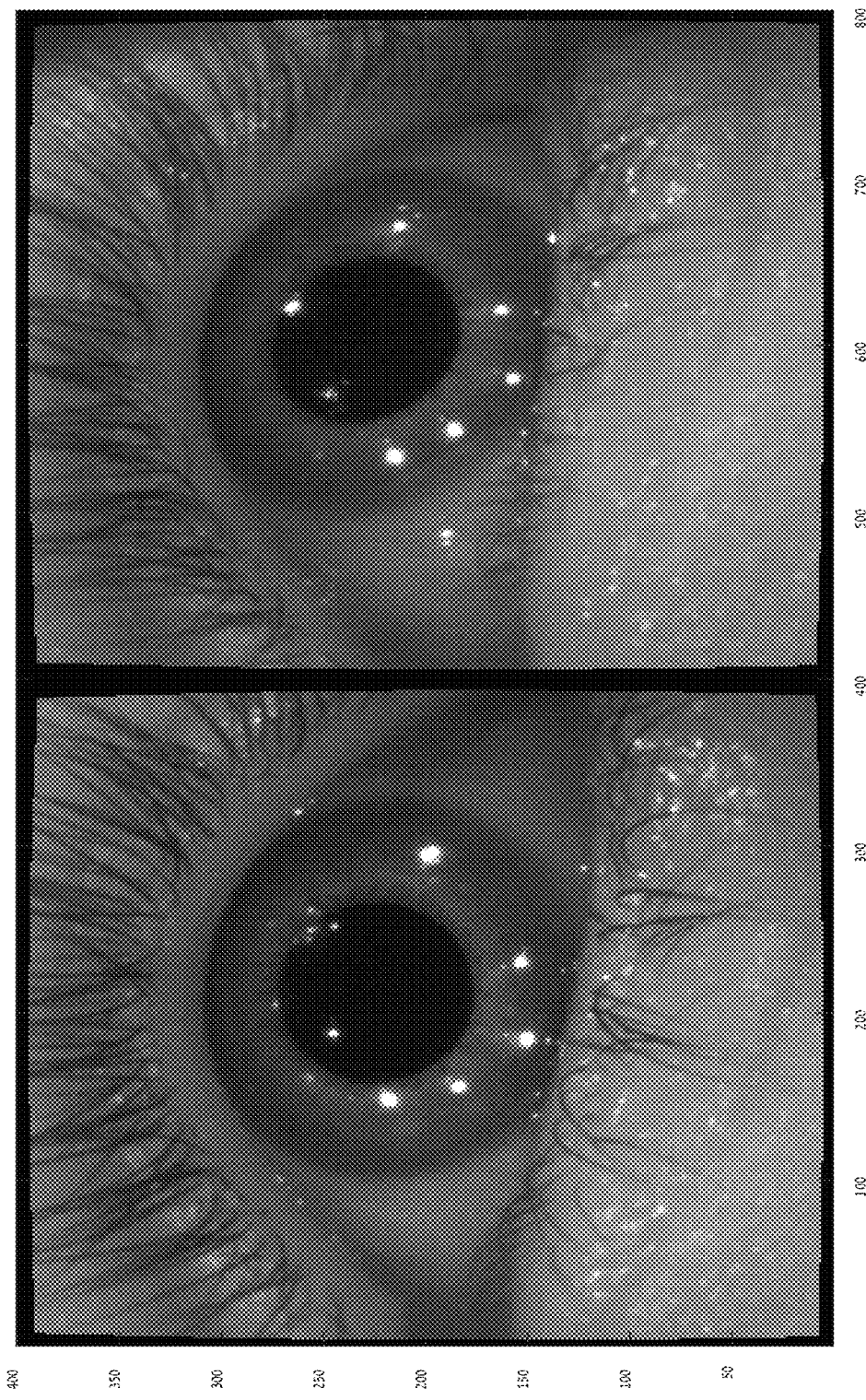
FIG. 3 shows two stereo images of an eye captured at different angles.

Reference is made to FIG. 3, showing two stereo images of an eye of a user taken at different angles.

Figure 4A:
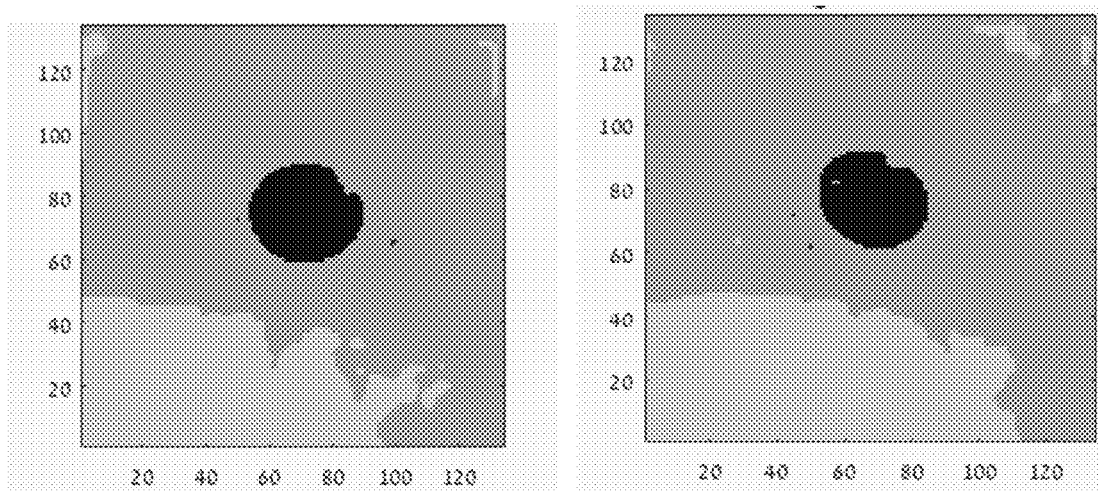
FIGS. 4A-4D are examples of pupil detection stages according to some embodiments of the presently disclosed subject matter.
Figure 4B:
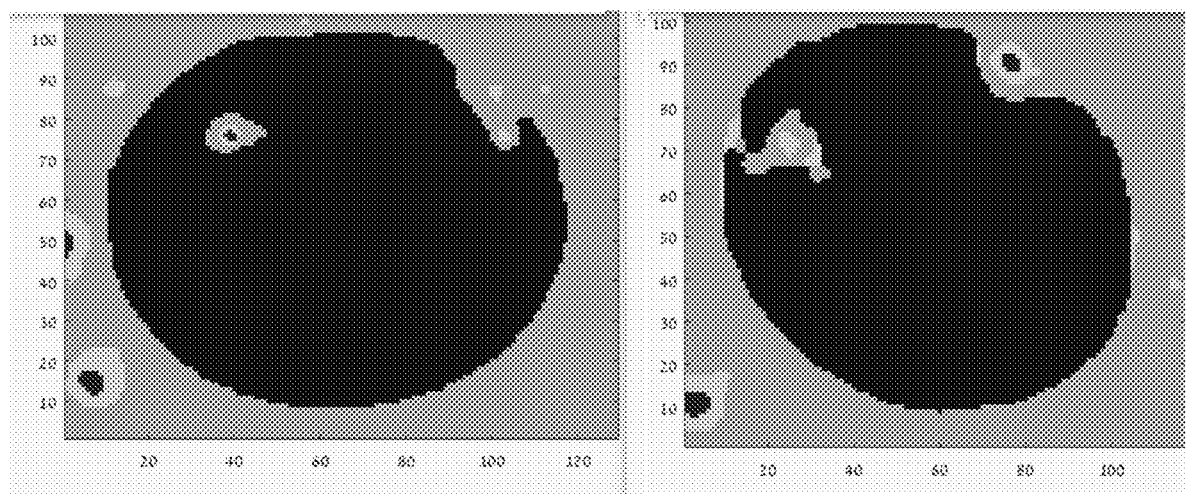
Figure 4C:
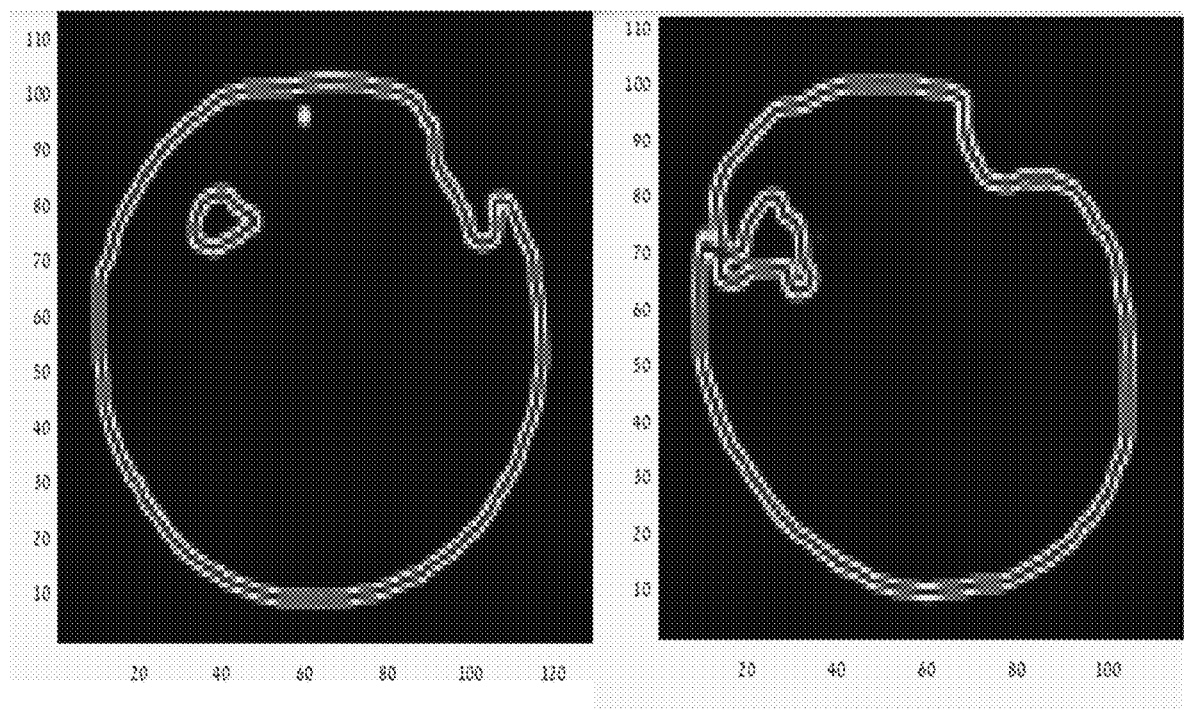
Figure 4D:
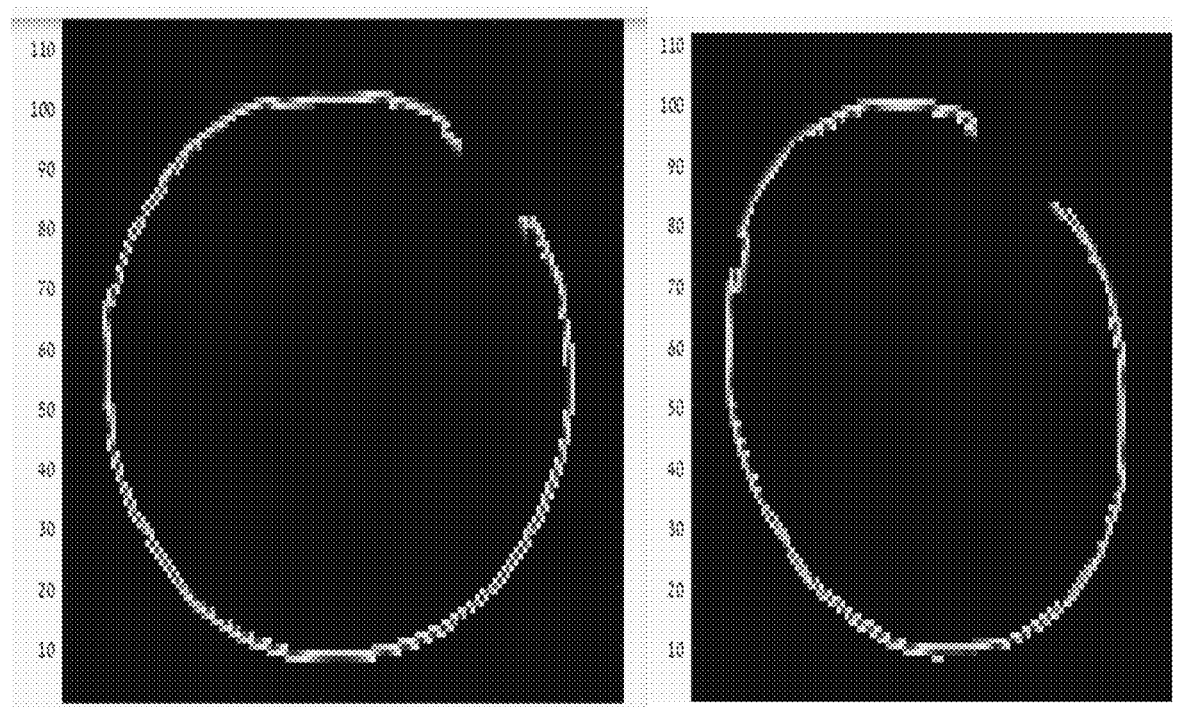

Reference is made to FIGS. 4A-4D, showing examples of data processing of the two stereo images of FIG. 3 for pupil region detection according to some embodiments of the presently disclosed subject matter. FIG. 4A illustrates the segmentation stage in which each image is segmented to identify pixels related to the pupil region. The pixels not related to the pupil region are discarded and the resolution is enhanced as illustrated in FIG. 4B. FIG. 4C shows the segmentation of the pupil border, based on an intensity map of each image. FIG. 4D shows the pupil border refinement, based on projection of a geometrical representation of the pupil (e.g. ring-like shape) on each image. The regions of FIG. 4D are then triangulated between the images and the pupil diameter, and 3D position and direction are determined.

Figure 5:
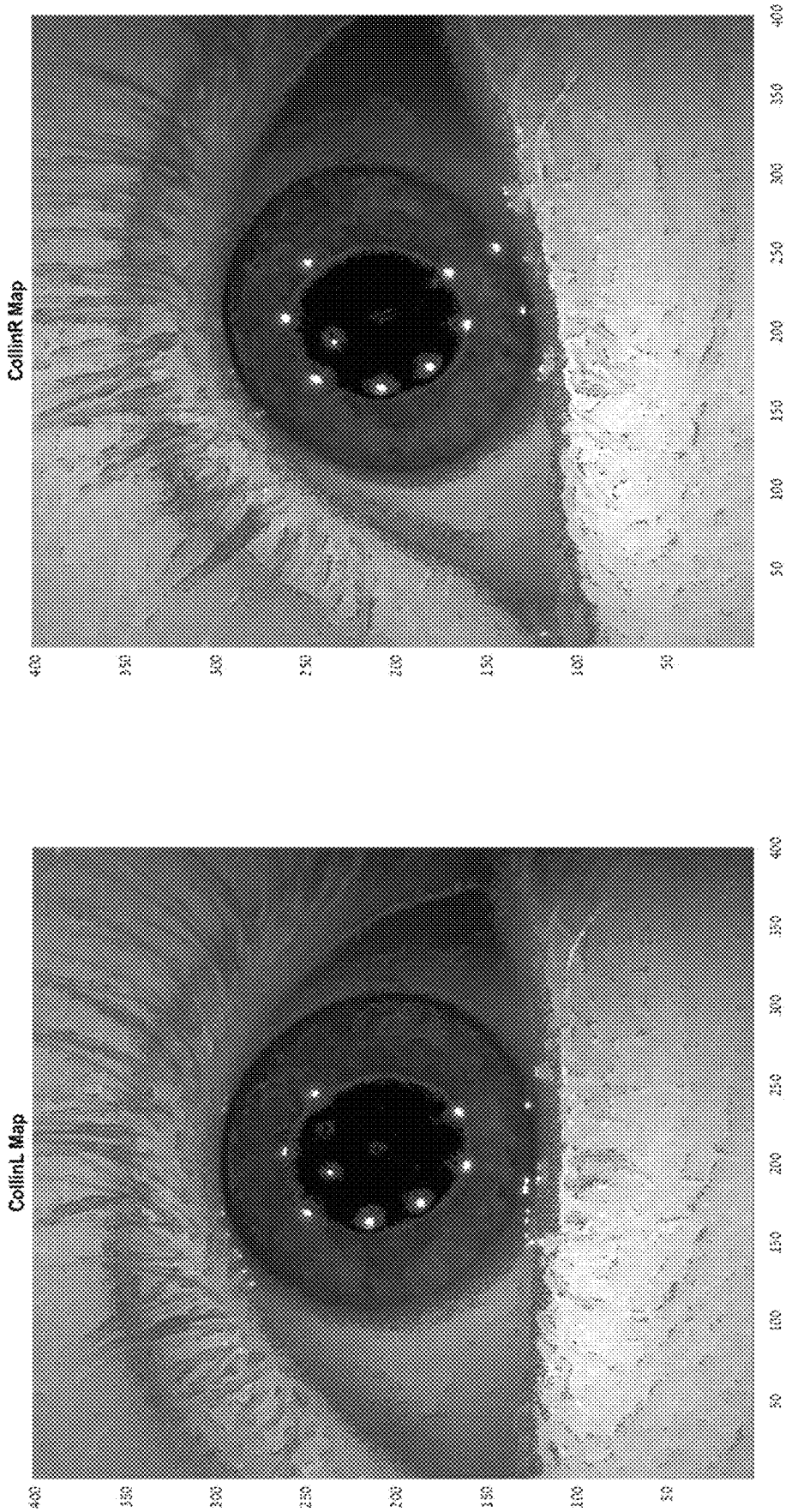
FIG. 5 are examples of eye feature detection stages exemplified on the images of FIG. 3 according to some embodiments of the presently disclosed subject matter.

Reference is made to FIG. 5, showing examples of data identification of eye features of the two stereo images of FIG. 3 according to some embodiments of the presently disclosed subject matter. The marked regions represent the regions in which the local direction of the image intensity gradient is substantially uniform.

Figure 6:
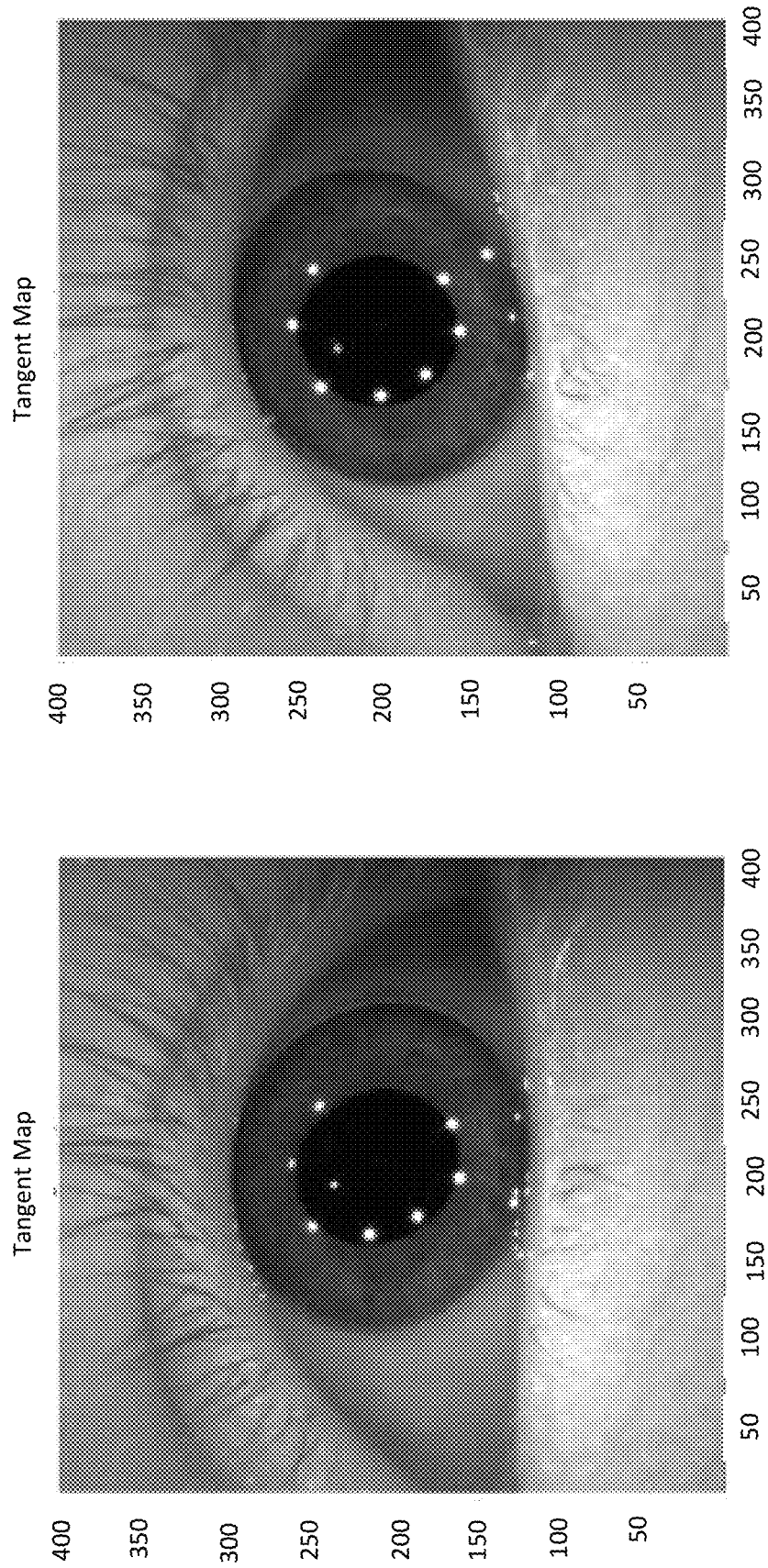
FIG. 6 are examples of projection of the limbus circle exemplified on the images of FIG. 3 according to some embodiments of the presently disclosed subject matter.

Reference is made to FIG. 6, showing examples of the limbus recognition process based on a projection of an ellipse function on each image of the two stereo images of FIG. 3 according to some embodiments of the presently disclosed subject matter.

Figure 7:
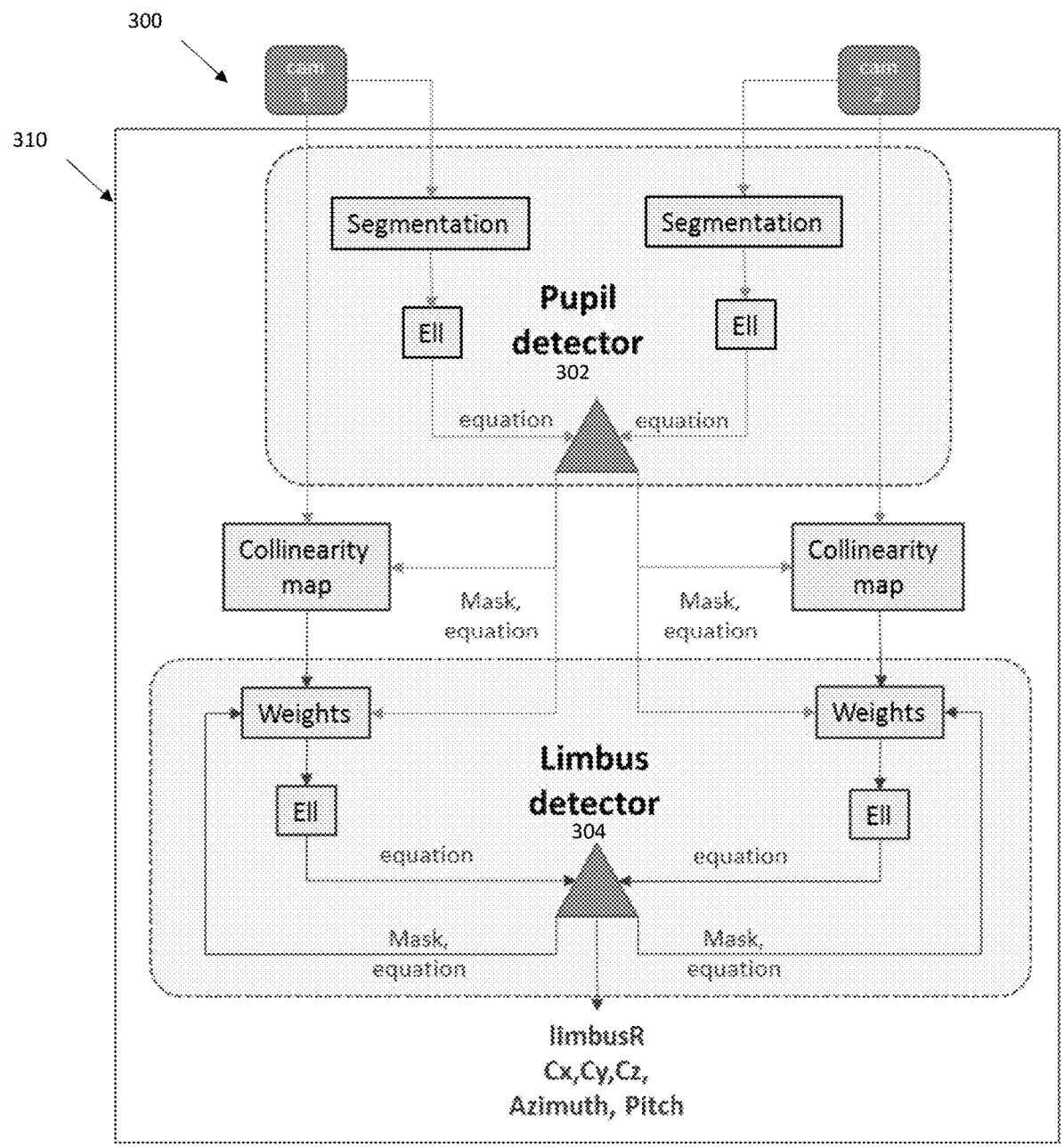
FIG. 7 is a schematic block diagram exemplifying possible functional parts of the eye tracking device according to some embodiments of the presently disclosed subject matter.

Reference is made to FIG. 7, exemplifying a block diagram illustrating possible functional parts of the eye tracking device of the presently disclosed subject matter. In this specific and non-limiting example, the eye tracking device 300 includes two imagers referred to herein as cam 1 and cam 2 being configured for capturing at least one image of each user's eye at a different angle. Each imager is focused on the user's iris. Eye tracking device 300 includes a processing unit 310 which includes a pupil detector 302 and a limbus detector 304. Pupil detector 302 is a specific example of a region detector as defined with respect to FIG. 1 above. Pupil detector 302 includes a plurality of modules and is configured and operable for receiving each image of the at least two images being indicative of each user's eye and identifying image data indicative of the limbus region in each image and generating data indicative of the limbus region. This may be implemented by using eye feature detection such as pupil region detection, or by using a neural network. Each image is segmented by the segmentation module to identify pixels related to the pupil region. The pixels not related to the pupil region are discarded in each image and the resolution is enhanced. Then, each ellipse module Ell calculates an elliptic curve corresponding to the pupil region on each image to find the matched elliptic curve. A three-dimensional equation, being indicative of the three-dimensional pupil region, is generated for each image. Then, a first triangulation is performed matching the three-dimensional equations of the two stereo images to provide the direction of the pupil when the distance between the two imagers capturing the two stereo images is known. Following this, using the average size of a limbus, and assuming that both pupil and limbus are co-centered and are in the same plane, the algorithm produces a three-dimensional limbus parameters estimation. This three-dimensional limbus region is projected onto each image, referred to herein as a Mask equation as illustrated in FIG. 3. For example, the limbus region may be bounded by two elliptic curves. The Mask equation is used by the Collinearity map module, which gives a first estimation of the limbus projection on each image. The Mask equation is also used by the Weight module.

To determine the three-dimensional limbus parameters, collinearity module, referred to herein as a collinearity map, performs mathematical transformations. In a specific and non-limiting example, such mathematical transformations may include calculating an image intensity gradient map of the limbus based on the pupil direction, identifying at least one region of the limbus structure in which the direction of the gradient is substantially uniform, processing data indicative of the limbus structure by weighting the pixels of such regions, and determining the three-dimensional limbus parameters based on the matching pixels related to the eye limbus. Alternatively, such mathematical transformations may include using an entropy of an image. In a specific and non-limiting example, collinearity map module generates a gradient collinearity map from the original image masked by the estimated limbus area region (calculated from the pupil 3D parameters and average limbus size). The limbus detector 304 receives the three-dimensional equation being indicative of the three-dimensional limbus region and the direction of the limbus. A ring-shaped region is then projected onto each eye image to produce the estimated limbus region. Most of the pixels of the image, such as the pupil, most of the iris, most of the sclera, and most of the eyelids, are then discarded by using a mask equation, leaving a ring around a potential limbus location, based on the estimated anatomical properties of the normal eye.

Module Weights, based on the collinearity map module, assigns weights to each pixel of probability of this pixel belonging to the limbus area. Then module Weights is used to refine the potential limbus area, and provides an input to the Ell module, which looks for a matching ellipse estimation of the limbus.

To perform the second triangulation, several techniques such as cones' triangulation or quadratic estimation (linear or non-linear) may be implemented. The processing unit 310 is configured and operable to determine a three-dimensional position and gaze direction of the user's eye by triangulation of the geometrical representation of the limbus structure of at least two images by using linear or non-linear quadratic estimation. In this specific and non-limiting example, the cones' triangulation may be performed as follows: each ellipse module Ell generates a mathematical function/equation of a geometrical representation of the limbus defining an anatomical relationship between the identified virtual regions corresponding to certain eye features (e.g. an ellipse having a center corresponding to the center of the pupils) and the limbus is calculated for each image. The elliptic structures of each image are compared, and the intersection between the cones, defined by the elliptic structures, defines an ellipse in space, whose projections match elliptic structures of the two images. This defines the three-dimensional limbus parameters referred to herein as limbus R, Cx, Cy, Cz, Azimuth and Pitch. In this connection, it should be noted that, in the presently disclosed subject matter, the three-dimensional limbus parameters are obtained by triangulation of ellipses, and not by pixel triangulation. As described above, pixel triangulation of a limbus may be practically impossible because the correspondence between pixels of different images is not known (because most of the pixels along the epipolar line of the second image look too similar). In classical computer vision, special close pixel area characteristics are used, such as different colors, corners, line intersections or texture patches that allow to characterize matching between two pixels along the epipolar lines from different images. Such features are missing in the limbus area, because of the rough boundary of the limbus, generally defined as a wide region, thus not allowing the usage of classical Natural Features tracking algorithms. Then, a mask is used to discard regions related to eye features. An iterative pixel filtration process is then used, repeating the same procedure as described above to more accurately define the limbus region and reduce the limbus region size.

Alternatively or additionally, the iterative pixel filtration process may be implemented by using a linear quadratic estimation such as a Kalman filter or a non-linear quadratic estimation such as the extended Kalman filter and the unscented Kalman filter. The Kalman filter produces an estimate of the limbus equation of the five degrees of freedom (e.g. elliptic structure) as an average of the eye's predicted state and of the new measurement using a weighted average. The weights are calculated from the covariance, a measure of the estimated uncertainty of the prediction of the eye's state. The result of the weighted average is a new state estimate that lies between the predicted and measured state, and has a better estimated uncertainty than either states, taken alone. This process is repeated at every time step, with the new estimate and its covariance informing the prediction used in the following iteration.

At the end of the process, processing unit 310 determines the three-dimensional position and gaze direction of the user's eye based on the three-dimensional limbus parameters.

Figure 8:
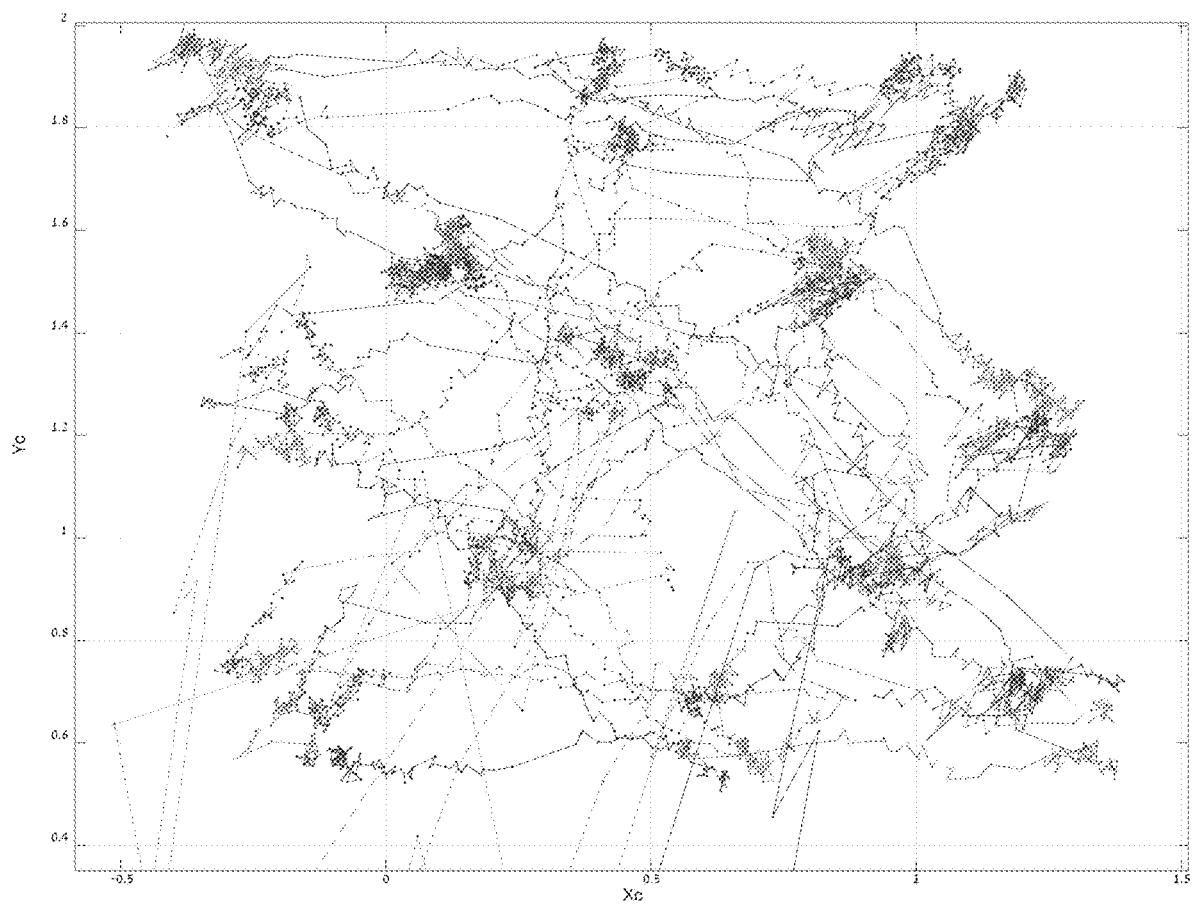
FIG. 8 represents a two-dimensional eye tracking trajectory obtained by using the teachings of the presently disclosed subject matter.

Reference is made to FIG. 8, exemplifying a two-dimensional eye tracking position trajectory obtained by using the teachings of the presently disclosed subject matter in which the different colors differentiate between different parts of the trajectory, i.e. colors change in time. The axes Xc and Yc are measured in millimeters.

Figure 9:
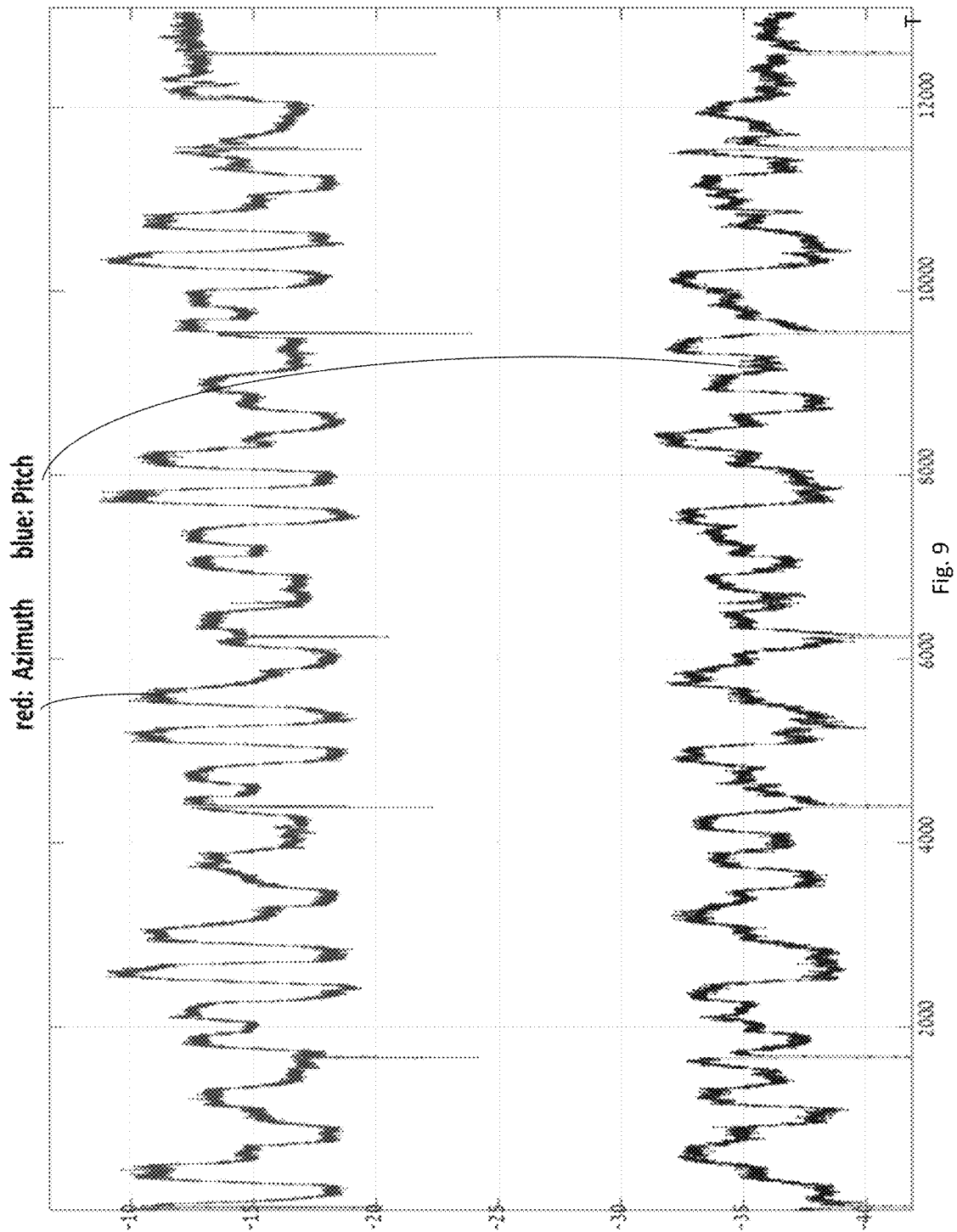
FIG. 9 represents two angular degrees of freedom of the eye tracking orientation trajectory (i.e. angle measurement) in terms of azimuth and pitch as a function of time.

Reference is made to FIG. 9, exemplifying the two angular degrees of freedom of the eye tracking orientation trajectory of FIG. 8 (i.e. angle measurement measured in degrees) in terms of azimuth and pitch as a function of time (measured in milliseconds). FIGS. 8, 9 and 10 show data from the same recording.

Figure 10A:
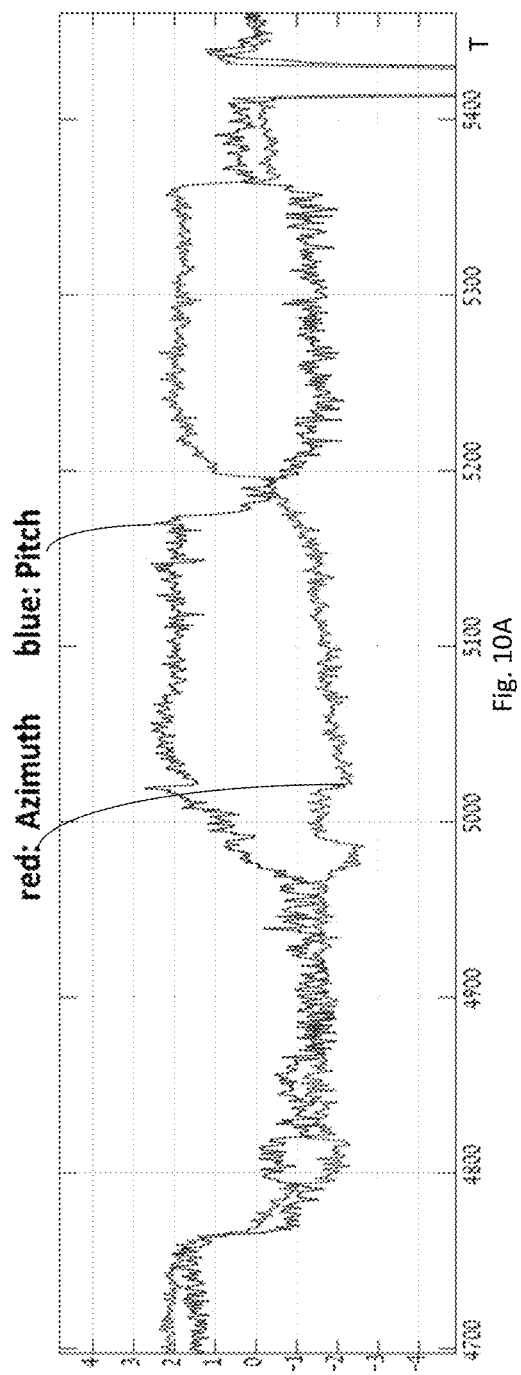
FIGS. 10A-10B represent the five degrees of freedom of the eye tracking trajectory obtained by using the teachings of the presently disclosed subject matter.
Figure 10B:
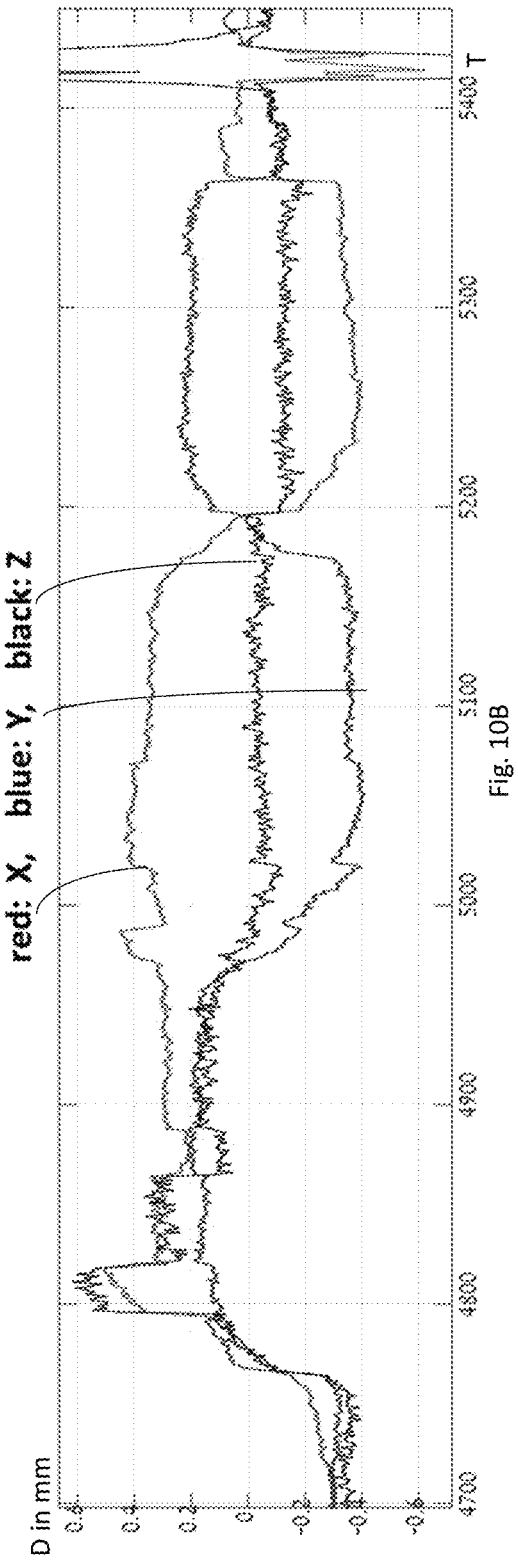

Reference is made to FIGS. 10A-10B, exemplifying the five degrees of freedom of the eye tracking trajectory of FIG. 8. More specifically, FIG. 10A shows the two angular degrees of freedom of the eye tracking orientation trajectory (i.e. angle measurement measured in degrees) in terms of azimuth and pitch as a function of time. FIG. 10A is a magnification of a partial section of the graph of FIG. 9 above. FIG. 10B shows the three-dimensional degrees of freedom of the eye tracking position trajectory in the Cartesian coordinate space as a function of time (measured in milliseconds).

The invention claimed is:

1. An eye tracking device comprising:
a processing unit configured and operable for
receiving at least two images being indicative of a user's eye, identifying, in each image, at least one region related to an eye limbus being defined as a transitional zone between a cornea and a sclera of the user;
determining geometrical representation of a limbus structure by digital image pre-processing, and
determining a three-dimensional position and orientation of the user's eye by triangulation of the geometrical representation of the limbus structure of the at least two images, wherein said processing unit comprises a limbus detector configured and operable for receiving data indicative of the limbus region.

2. The eye tracking device of claim 1, wherein the geometrical representation of the limbus structure includes a ring-shaped or an ellipse-shaped structure.

3. The eye tracking device of claim 1, further comprising:
at least two imagers, each imager being configured for capturing at least one image of user's eye at a different angle.

4. The eye tracking system of claim 1, wherein, for each image, the limbus detector is configured and operable for digital image pre-processing including calculating an image intensity gradient map of the limbus region, identifying at least one region of the limbus structure in which the local directions of the gradient is substantially uniform, processing data indicative of the limbus structure by weighting the pixels of such at least one region, and determining geometrical representation of the limbus structure based on matching pixels related to eye limbus.

5. The eye tracking device of claim 1, further comprising:
a limbus triangulator being configured and operable to receive data indicative of geometrical representation of the limbus structure for each image, and to perform triangulation of the geometrical representations of at least two images to determine three-dimensional limbus parameters.

6. The eye tracking system of claim 5, wherein the processing unit is configured and operable to determine a three-dimensional position and orientation of the user's eye, based on the three-dimensional limbus parameters.

7. The eye tracking device of claim 5, wherein the three-dimensional limbus parameters include at least one of the three coordinates of the center of the limbus, the direction of the normal to the limbus plane, the location of the plane of the limbus, and the size of the limbus.

8. The eye tracking device of claim 5, wherein the limbus triangulator is configured and operable to determine a radius of the limbus and/or torsional rotation of the limbus.

9. The eye tracking device of claim 1, wherein the processing unit comprises a region detector configured and operable for receiving each image of the at least two images being indicative of a user's eye, and identifying image data indicative of an initial limbus region in each image by using an iterative pixel filtration process and generating data indicative of the initial limbus region.

10. The eye tracking device of claim 9, wherein the region detector is configured for at least one of identifying image data indicative of at least one region related to an eye limbus by at least one of identifying image data indicative of eye features such as pupil, eyelids, sclera, iris and eyelashes, and identifying at least one region related to an eye limbus region based on anatomical parameters; identifying image data indicative of eye features by using machine learning or identifying the image data indicative of eye features by segmenting each image for identifying pixels related to the pupil region, and identifying at least one limbus region based on the pupil region.

11. The eye tracking device of claim 10, wherein the limbus triangulator is configured for at least one of: performing triangulation between at least two pupil geometric representations to determine three-dimensional pupil parameters; the three-dimensional pupil parameters including at least one of the direction of the normal to the pupil plane, the coordinates of the center of the pupil and the pupil diameter, estimating the location of the initial eye limbus region based on the three-dimensional pupil parameters, and generating data indicative of the initial region location of the limbus in each image or processing the triangulated three-dimensional limbus, re-projecting the triangulated limbus region back to image planes, and refining the limbus region at each image.

12. The eye tracking device of claim 1, wherein the digital image pre-processing is configured to calculate some virtual regions corresponding to physical areas of the eye, without dependency on an angle at which the at least two images were taken.

13. A method for eye tracking, the method comprising:
receiving image data indicative of at least two images of a user's eye;
identifying at least one region related to the eye limbus in each image; said eye limbus being defined as a transitional zone between a cornea and a sclera of the user;
determining geometrical representation of the limbus structure; wherein the determining geometrical representation of the limbus structure comprises digital image pre-processing;
performing triangulation of the geometrical representation of the limbus structure of the at least two images to thereby determine a three-dimensional position and orientation of the user's eye.

14. The method of claim 13, further comprising:
capturing at least two images of a user's eye from different angles.

15. The method of claim 13, wherein the digital image pre-processing comprises calculating an image intensity gradient map of the limbus, identifying in each image at least one region of the limbus structure in which the local directions of the gradient is substantially uniform and processing data indicative of the limbus structure by weighting the pixels of such at least one regions and generating the geometrical representation of the limbus structure based on matching pixels related to the eye limbus.

16. The method of claim 15, further comprising:
determining three-dimensional limbus parameters including at least one of the three coordinates of the center of the limbus and the direction of the limbus, and determining the three-dimensional position and orientation of the user's eye, based on the three-dimensional limbus parameters.

17. The method of claim 16, wherein the determining of the three-dimensional position and orientation of the user's eye comprises processing of the three-dimensional limbus parameters.

18. The method of claim 13, further comprising:
determining a radius of the limbus and/or torsional rotation of the limbus.

19. The method of claim 13, wherein the geometrical representation of the limbus structure includes a ring-shaped or an ellipse-shaped structure.

20. The method of claim 13, further comprising:
identifying image data indicative of an initial limbus region in each image by using an iterative pixel filtration process and generating data indicative of the initial limbus region.

21. The method of claim 20, wherein the identifying, in each image, image data indicative of an initial limbus region comprises at least one of identifying image data indicative of eye features such as pupil, eyelids, sclera, iris and eyelashes, and identifying an initial limbus region based on anatomical parameters.

22. The method of claim 21, wherein the identifying image data indicative of eye features is performed by using machine learning.

23. The method of claim 21, wherein identification of image data indicative of eye features comprises segmenting each image for identifying pixels related to the pupil region, and identifying at least one limbus region based on the pupil region.

24. The method of claim 23, further comprising: at least one of performing triangulation between at least two pupil geometric representations to determine three-dimensional pupil parameters; the three-dimensional pupil parameters including at least one of the direction of the normal to the pupil plane, the coordinates of the center of the pupil and the pupil diameter in each image, estimating the location of the initial eye limbus region based on the three-dimensional pupil parameters, and generating data indicative of the initial region location of the limbus in each image; or processing the triangulated three-dimensional limbus, re-projecting the triangulated limbus region back to image planes, and refining the limbus region at each image.

* * * * *